(12) United States Patent
Munige et al.

(10) Patent No.: US 11,573,369 B2
(45) Date of Patent: Feb. 7, 2023

(54) UNIVERSAL OPTICAL FIBRE COMPATIBLE WITH ROD-IN-CYLINDER

(71) Applicant: Sterlite Technologies Limited, Gurgaon (IN)

(72) Inventors: Srinivas Munige, Gurugram (IN); Apeksha Malviya, Gurugram (IN); Anand Pandey, Gurugram (IN)

(73) Assignee: Sterlite Technologies Limited, Haryana (IN)

( * ) Notice: Subject to any disclaimer, the term of this patent is extended or adjusted under 35 U.S.C. 154(b) by 0 days.

(21) Appl. No.: 17/316,719

(22) Filed: May 11, 2021

(65) Prior Publication Data

US 2022/0003923 A1     Jan. 6, 2022

(51) Int. Cl.
    *G02B 6/02*       (2006.01)
    *G02B 6/028*      (2006.01)
    *G02B 6/036*      (2006.01)

(52) U.S. Cl.
CPC ....... *G02B 6/0286* (2013.01); *G02B 6/02004* (2013.01); *G02B 6/02214* (2013.01); *G02B 6/02395* (2013.01); *G02B 6/0365* (2013.01); G02B 6/028 (2013.01); G02B 6/0281 (2013.01)

(58) Field of Classification Search
CPC ............ G02B 6/02004; G02B 6/02214; G02B 6/02395; G02B 6/028; G02B 6/0281; G02B 6/0286; G02B 6/0365
See application file for complete search history.

(56) References Cited

U.S. PATENT DOCUMENTS

| | | | | |
|---|---|---|---|---|
| 8,081,854 | B2 * | 12/2011 | Yoon .................... | G02B 6/0285 385/127 |
| 8,588,569 | B2 * | 11/2013 | Bookbinder ....... | G02B 6/03638 385/124 |
| 10,444,427 | B2 * | 10/2019 | Bookbinder ......... | G02B 6/4478 |
| 10,591,668 | B2 * | 3/2020 | Bookbinder ....... | G02B 6/03633 |
| 2013/0034322 | A1 * | 2/2013 | Auth .................... | G02B 6/0286 385/124 |
| 2019/0049660 | A1 * | 2/2019 | Bookbinder ....... | G02B 6/03633 |

* cited by examiner

*Primary Examiner* — Ryan A Lepisto
(74) *Attorney, Agent, or Firm* — Steven R. Fairchild; Michael J. Pennington (57) ABSTRACT

The present disclosure provides an optical fibre (100). The optical fibre (100) includes a glass core (102), a trench region (106) and a cladding (108). The trench region (106) has a trench curve parameter $\alpha_{trench}$ in range of 5 to 8. The optical fibre (100) has a mode field diameter in range of 8.7 micrometers to 9.7 micrometers at wavelength of 1310 nanometer.

9 Claims, 3 Drawing Sheets

UNIVERSAL OPTICAL FIBRE COMPATIBLE WITH ROD-IN-CYLINDER

TECHNICAL FIELD

The present disclosure relates to the field of optical fibre transmission. More particularly, the present disclosure relates to a bend insensitive optical fibre with large mode field diameter. The present application is based on, and claims priority from an Indian Application Number 202011004900 filed on 3 Jul. 2020, the disclosure of which is hereby incorporated by reference herein

BACKGROUND

With the advancement of science and technology, various modern technologies are being employed for communication purposes. One of the most important modern communication technologies is optical fibre communication technology using a variety of optical fibres. Optical fibre is used to transmit information as light pulses from one end to another. One such type of optical fibre is a single mode optical fibre. The single mode optical fibre is used in FTTx and long haul communication. The telecommunication industry is continuously striving for designs to achieve high data rate capacity and low losses. The ongoing research suggests that the single mode optical fibre of G657 and G652D category are used for FTTx and long-haul applications respectively. The single mode optical fibre of G652D and G657 categories faces major challenges in FTTx and long haul communication respectively. G652D fibres faces major challenges in FTTx application due to high macro bend losses and G657 category fibres face major challenges in long haul applications due to high nonlinear effects as a result of low MFD. Also, low MFD in G657A2 in long haul communication results in a power penalty more than 1.5 decibel as compare to G652D.

The significantly matured G652.D category fibres have already taken millions of kms in current FTTX infrastructure. The one advantage that G652D has is its ultra-splicing capabilities but average macro-bending characteristics. To address the need to enhance the macro-bending, the G657A2 and G657A1 optical fibres have been developed and evolved. The replacement of G652.D fibres with G657.A2 or G657 A1 can be a solution. However, G657.A2 or G657 A1 has their own issues when it comes to splicing capabilities. There is always a need to develop an optical fibre that exhibits the property of both G657A2 and G657D so as to achieve flexible splicing capability as well as good macro bend performance i.e. easy splicing of G.657.A2/A1 with G.652.D. It is usually noticed that there is a persisting problem of using G.657.A2 fibres, because of OTDR artifacts that occur when splicing them to standard single mode fibres i.e. G.652D.

There always seems to be a need to develop an optical fibre which would have an optimize design with good macro-bend characteristics, as well as is also compliant to current network installed G.652.D. For example, G657A2 has a mode field diameter is the range as same as mode field diameter as that of G.652.D.

In light of the above stated discussion, there is a need for an optical fibre that overcomes the above sited drawbacks to use for FTTx as well as long haul and access networks.

OBJECT OF THE DISCLOSURE

A primary object of the present disclosure is to provide a bend insensitive optical fibre with large mode field diameter.

SUMMARY

In an aspect of the present disclosure, the present disclosure provides an optical fibre. The optical fibre includes a glass core, a trench region and a cladding. The trench region has a trench curve parameter $\alpha_{trench}$ in range of 5 to 8. The optical fibre has a mode field diameter in range of 8.7 micrometers to 9.7 micrometers at wavelength of 1310 nanometer. The optical fibre has at least one of macro-bend loss up to 0.5 decibel per turn corresponding to wavelength of 1550 nanometer at bending radius of 7.5 millimeter, macro-bend loss up to 1.0 decibel per turn corresponding to wavelength of 1625 nanometer at bending radius of 7.5 millimeter, macro-bend loss up to 0.1 decibel per turn corresponding to wavelength of 1550 nanometer at bending radius of 10 millimeter, macro-bend loss up to 0.2 decibel per turn corresponding to wavelength of 1625 nanometer at bending radius of 10 millimeter and macro-bend loss up to 0.03 decibel per 10 turn corresponding to wavelength of 1550 nanometer at bending radius of 15 millimeter, and macro-bend loss is up to 0.1 decibel per 10 turn corresponding to wavelength of 1625 nanometer at bending radius of 15 millimeter.

The optical fibre may further include a buffer clad region after the glass core and before the trench region.

The glass core may have a core curve parameter $\alpha_{core}$ in a range of 6 to 12.

The optical fibre may have an attenuation of up to 0.18 dB/km at a wavelength of 1550 nanometer.

The optical fibre may splice with standard single mode fibre such that the optical fibre has full compatibility with a G652.D category installed optical fibres and G657.A1 category optical fibre.

The optical fibre may include a buffer clad region. The buffer clad region has a buffer relative refractive index in range of −0.01 to 0.01 and a buffer thickness of up to 5.5 microns.

At least one of the glass core may have a core relative refractive index in range of 0.30 to 0.40 and the glass core may have a thickness is in the range of 3.5 to 4.5 microns, The trench region may have a trench relative refractive index in a range of −0.25 to −0.35 and a trench thickness in range of 6 to 10 microns.

The cladding has a cladding relative refractive index in range of 0 to 0.05 and a cladding thickness in a range of 42.9 to 47.1 microns.

The optical fibre may have at least one of a cable cut off wavelength of up to 1260 nanometer, a zero dispersion wavelength in range of 1300 nanometer to 1324 nanometer and a dispersion of up to 18 picosecond/(nanometer-kilometer).

STATEMENT OF THE DISCLOSURE

The present disclosure provides an optical fibre. The optical fibre includes a glass core, a trench region and a cladding. The trench region has a trench curve parameter $\alpha_{trench}$ in range of 5 to 8. The optical fibre has a mode field diameter in range of 8.7 micrometers to 9.7 micrometers at wavelength of 1310 nanometer. The optical fibre has at least one of macro-bend loss up to 0.5 decibel per turn corresponding to wavelength of 1550 nanometer at bending radius of 7.5 millimeter, macro-bend loss up to 1.0 decibel per turn corresponding to wavelength of 1625 nanometer at bending radius of 7.5 millimeter, macro-bend loss up to 0.1 decibel per turn corresponding to wavelength of 1550 nanometer at bending radius of 10 millimeter, macro-bend loss up to 0.2 decibel per turn corresponding to wavelength of 1625 nanometer at bending radius of 10 millimeter and macro-bend loss up to 0.03 decibel per 10 turn corresponding to wavelength of 1550 nanometer at bending radius of 15 millimeter, and macro-bend loss is up to 0.1 decibel per 10 turn corresponding to wavelength of 1625 nanometer at bending radius of 15 millimeter. Further, the optical fibre has a core clad concentricity error of up to 0.5. Further, the optical fibre has cladding non-circularity percentage of up to 0.7 percent. Further, the optical fibre has a zero dispersion slope of up to 0.092 picosecond/(nanometer$^2$·kilometer).

BRIEF DESCRIPTION OF FIGURES

Having thus described the disclosure in general terms, reference will now be made to the accompanying figures, wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Figure 1:
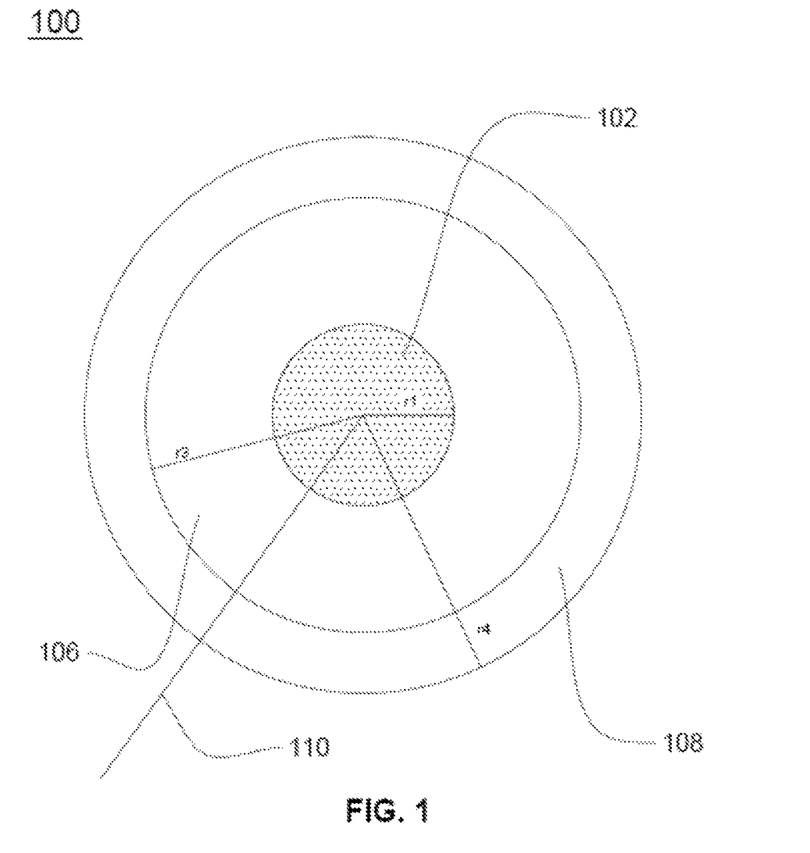
FIG. 1 illustrates a cross-sectional view of an optical fibre.
Figure 2:
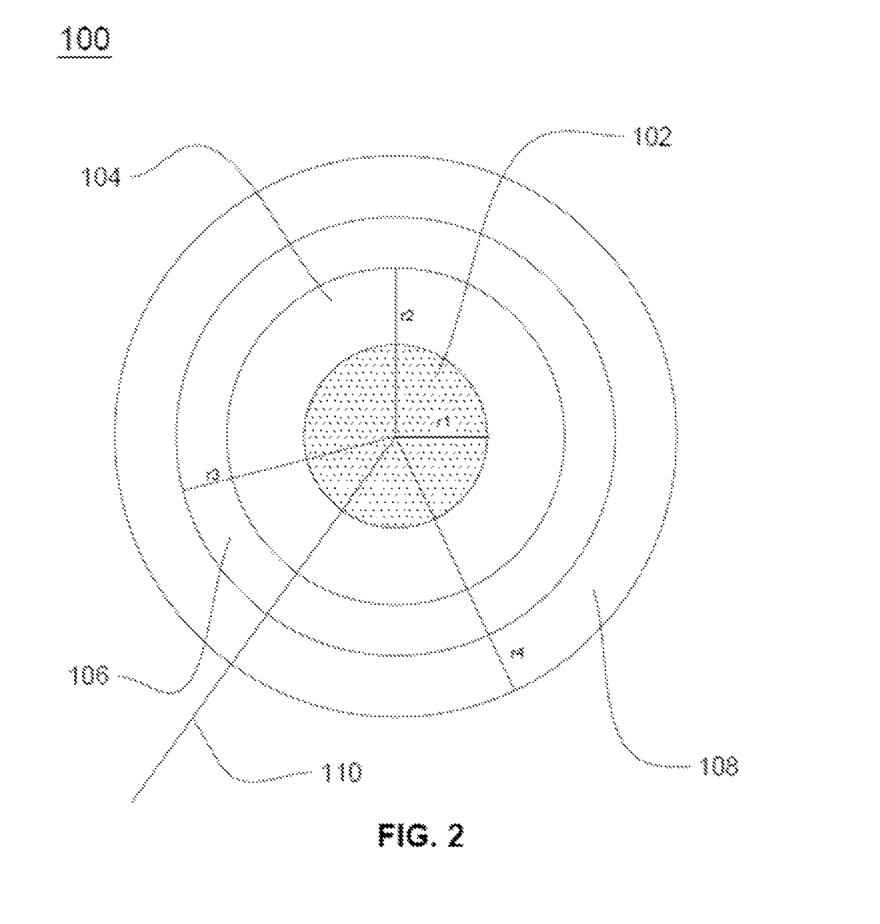
FIG. 2 illustrates another cross-sectional view of an optical fibre of FIG. 1.

FIG. 1 illustrates a cross-sectional view of an optical fibre 100. FIG. 2 illustrates another cross-sectional view of the optical fibre 100 of FIG. 1. In general, optical fibre is a thin strand of glass or plastic capable of transmitting optical signals. The optical fibre 100 is configured to transmit information over long distances with low non-linear effects.

The optical fibre 100 includes a glass core 102, a trench region 106 and a cladding 108. In addition, the optical fibre 100 may include a buffer clad region 104. In general, core is an inner part of an optical fibre and cladding is an outer part of the optical fibre. The glass core 102 is defined along a central longitudinal axis 110 of the optical fibre 100. In addition, the central longitudinal axis 110 is an imaginary axis passing through center of the optical fibre 100.

Further, the glass core 102, the cladding 108, the buffer clad region 104 and the trench region 106 of the optical fibre 100 are associated with a relative refractive index profile. In general, the relative refractive index profile is maintained as per required level based on concentration of chemicals used for manufacturing of an optical fibre. In addition, the chemicals used for manufacturing of the optical fibre include one or more materials and one or more dopants. Further, the one or more materials such as, but not limited to, silica, fluorozirconate, fluoroaluminate, chalcogenide, crystalline materials and the one or more dopants such as, but not limited to, germanium dioxide (GeO2), aluminium oxide (Al2O3), fluorine or boron trioxide (B2O3) are deposited over surface of initial material with facilitation of flame hydrolysis. Furthermore, the initial material is a substrate rod or a tube.

The relative refractive index profile determines relationship between a refractive index of the optical fibre 100 and a radius of the optical fibre 100. In addition, the radius of the optical fibre 100 corresponds to a first radius $r_1$, a second radius $r_2$, a third radius $r_3$ and a fourth radius $r_4$. Further, manufacturing of the optical fibre 100 is carried out after manufacturing of a preform. Furthermore, the refractive index profile of the optical fibre 100 is determined during manufacturing of the preform of the optical fibre 100.

The glass core 102 of the optical fibre 100 has a core relative refractive index $\Delta_1$. In addition, the glass core 102 has maximum refractive index $n_{max}$ Further, the glass core 102 has a core curve parameter $\alpha_{core}$ (alpha). Furthermore, the glass core 102 of the optical fibre 100 has the first radius $r_1$. The first radius $r_1$ is in range of about 3.5 microns to 4.5 microns. Range of the first radius $r_1$ of the glass core 102 may vary. The glass core 102 may have the core relative refractive index $\Delta_1$ in range of about 0.30 to 0.40. The core relative refractive index $\Delta_1$ of the glass core 102 may vary. Moreover, the core curve parameter $\alpha_{core}$ may be in a range of about 6 to 12. The core curve parameter $\alpha_{core}$ may vary. The glass core 102 may have a thickness is in a range of 3.5 to 4.5. Thickness of the glass core 102 may vary.

The expression used for calculating the relative refractive index is produced below:

$$\Delta i = \left( \frac{n_i^2 - n_{clad}^2}{2 \times n_i^2} \right)$$

wherein, $n_{clad}$: refractive index of the pure silica;

$n_i$: refractive index of the $i_{th}$ layer;

$\Delta i$: the relative refractive index of $i_{th}$ layer.

The relative refractive index profile changes between the second radius $r_1$ and the fourth radius $r_4$ of the optical fibre 100. Further, the relative refractive index of the glass core 102, the cladding 108, the buffer clad region 104 and the trench region 106 has a pre-defined value. Furthermore, the radius of the glass core 102, the cladding 108, the buffer clad region 104 and the trench region 106 has pre-defined values. The pre-defined values of the relative refractive index are set to obtain good macro-bend performance and large mode field diameter.

The buffer clad region 104 is defined by the first radius $r_1$ and the second radius $r_2$ from the central longitudinal axis 110 of the optical fibre 100. The buffer clad region 104 has a buffer relative refractive index $\Delta_2$. Further, the trench region 106 is defined by the second radius $r_2$ and the third radius $r_3$ from the central longitudinal axis 110 of the optical fibre 100. The trench region 106 has a trench relative refractive index $\Delta_3$. Furthermore, the cladding 108 is defined by the third radius $r_3$ and the fourth radius $r_4$. Moreover, the cladding 108 has a cladding relative refractive index of $\Delta_4$.

The buffer clad region 104 of the optical fibre 100 has the second radius $r_2$ in range of about 9 microns to 10 microns. In addition, range of the second radius $r_2$ of the buffer clad region 104 may vary. The buffer clad region 104 of the optical fibre 100 has the buffer relative refractive index $\Delta_2$ may be in a range of about −0.01 to 0.01. The buffer relative refractive index $\Delta_2$ of the buffer clad region 104 of the optical fibre 100 may vary. The buffer clad region 104 may have a buffer thickness of up to 5.5 microns. The buffer thickness of the buffer clad region 104 may vary.

The trench region 106 of the optical fibre 100 has the third radius $r_3$ in range of about 15 microns to 20 microns. The third radius $r_3$ of the trench region 106 may vary. The trench region 106 of the optical fibre 100 may have the trench relative refractive index $\Delta_3$ in range of about −0.25 to −0.35. The trench relative refractive index $\Delta_3$ of the trench region 106 may vary. The trench region 106 has a trench curve parameter $\alpha_{trench}$ in range of about 5 to 8. In addition, value of the trench curve parameter $\alpha_{trench}$ of the trench region 106 may vary. The trench region 106 may have a trench thickness in range of 6 to 10 microns. The trench thickness of the trench region 106 may vary.

The cladding 108 of the optical fibre 100 has the fourth radius $r_4$ in range of about 62.1 microns to 62.9 microns. In addition, value of the fourth radius $r_4$ may vary. The cladding 108 may have the cladding relative refractive index $\Delta_4$ in range of 0 to 0.05. The cladding relative refractive index $\Delta_4$ of the cladding 108 of the optical fibre 100 may vary. The cladding 108 may have a cladding thickness in a range of 42.9 to 47.1 micrometers. The cladding thickness of the cladding 108 may vary.

The glass core 102 of the optical fibre 100 has maximum refractive index $n_{max}$. In addition, the buffer clad region 104 has refractive index of pure silica $n_{clad}$. Further, minimum refractive index of the trench region 106 is $n_{trench}$. Furthermore, expressions used to determine refractive index is given by below:

$$n(r) = n_{max}\left[1 - 2\Delta 1\left(\frac{r}{r1}\right)^\alpha\right]^{0.5}$$

for $r \leq r_1$ $n(r) = n_{clad}$ for $r_1 \leq r \leq r_2$ and $r \geq r_3$ $n(r) = n_{clad} - n_{trench}[1 + 2\Delta 3)(r3-r)/(r3-r2)^{\alpha_{trench}}]^{0.5}$ for $r_2 \leq r \leq r_3$ In addition, the optical fibre 100 has the mode field diameter. Further, the optical fibre 100 has the zero dispersion wavelength. Furthermore, the optical fibre 100 has the cable cut off wavelength. Moreover, the optical fibre 100 is associated with macro-bend loss.

The optical fibre 100 has the mode field diameter in range of about 8.7 microns to 9.5 microns at a wavelength of 1310 nanometer. In addition, range of the mode field diameter of the optical fibre 100 may vary. In general, mode field diameter defines a section or area of optical fibre in which the optical signals travel. The cladding 108 of the optical fibre 100 has a diameter in range of about 124.2 microns to 125.8 microns. The diameter of the cladding 108 of the optical fibre 100 may vary. The relative refractive index profile of the optical fibre 100 is designed to obtain a balance between desired macro-bend performance and high mode field diameter as optical fibre having large mode field diameter adversely impacts the macro bend performance.

The adverse impact of large mode filed diameter on the macro-bend performance is mitigated and desired macro bend performance is achieved with the design of the refractive index profile of the optical fibre 100 having the trench curve parameter $\alpha_{trench}$ tuned in the range of 5-8, and more preferably in the range of 5-10. In addition, the trench curve parameter $\alpha_{trench}$ below 5 increases and adversely impacts the macro bend performance, that is undesirable for the optical fibre 100 having large mode filed diameter range. In an example, the mode filed diameter is in the range from 8.7 to 9.7 micrometers at a wavelength of 1310 nanometers. The higher value of the trench curve parameter $\alpha_{trench}$ is up to 8, preferably up to 10.

The optical fibre 100 may have a cable cut off wavelength of up to 1260 nanometer. The cable cut off wavelength of the optical fibre 100 may vary. The optical fibre 100 may have zero dispersion wavelength in range of about 1300 nanometer to 1324 nanometer. In addition, zero dispersion wavelength of the optical fibre 100 may vary. The optical fibre 100 may have a dispersion of up to 18 picosecond/(nanometer-kilometer). The dispersion of the optical fibre 100 may vary.

The optical fibre 100 has macro-bend loss compliant to the ITU G657 A2. In general, bending loss is a loss that occurs when optical fibre is bent. In addition, bending loss includes macro-bend loss and a micro-bend loss. The optical fibre 100 has at least one of macro-bend loss up to 0.5 decibel per turn corresponding to wavelength of 1550 nanometer at bending radius of 7.5 millimeter. The optical fibre 100 has a macro-bend loss up to 1.0 decibel per turn corresponding to wavelength of 1625 nanometer at bending radius of 7.5 millimeter. The optical fibre 100 has a macro-bend loss up to 0.1 decibel per turn corresponding to wavelength of 1550 nanometer at bending radius of 10 millimeters. The optical fibre 100 has a macro-bend loss up to 0.2 decibel per turn corresponding to wavelength of 1625 nanometer at bending radius of 10 millimeters. The optical fibre 100 has a macro-bend loss up to 0.03 decibel per 10 turn corresponding to wavelength of 1550 nanometer at bending radius of 15 millimeters. The optical fibre 100 has a macro-bend loss up to 0.1 decibel per 10 turn corresponding to wavelength of 1625 nanometer at bending radius of 15 millimeters. The optical fibre 100 may be characterized by attenuation of up to 0.18 dB/km corresponding to wavelength of 1550 nanometer. Attenuation of the optical fibre 100 may vary corresponding to wavelength of 1550 nanometer.

Macro-bend loss is up to 0.1 decibel per turn at wavelength of 1550 nanometer at bending radius of 10 millimeters. In addition, macro-bend loss is up to 0.2 decibel per turn corresponding to wavelength of 1625 nanometer at bending radius of 10 millimeters. Further, macro-bend loss is up to 0.03 decibel per 10 turns corresponding to wavelength of 1550 nanometer at bending radius of 15 millimeters. Furthermore, macro-bend loss is up to 0.1 decibel per 10 turns corresponding to wavelength of 1625 nanometer at bending radius of 15 millimeters. In general, bending radius is a radius of the inner curvature formed on bending optical fibre.

Figure 3:
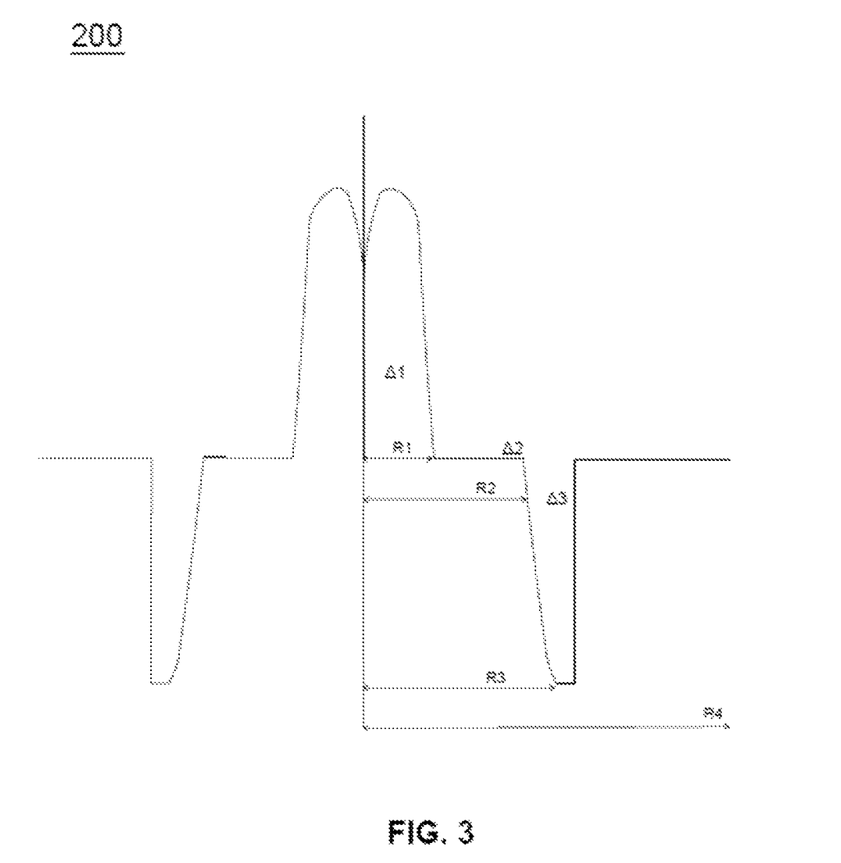
FIG. 3 illustrates a refractive index profile of the optical fibre.

FIG. 3 illustrates the refractive index profile 300 of the optical fibre 100. The refractive index profile 300 illustrates relationship between the relative refractive index of the optical fibre 100 and the radius of the optical fibre 100 (as shown in FIG. 1 and FIG. 2). The refractive index profile 300 shows change in the relative refractive index of the glass core 102, the buffer clad region 104, the trench region 106 and the cladding 108 with the radius of the optical fibre 100.

In an example, the core relative refractive index $\Delta_1$ has a value of about 0.32. In addition, the core curve parameter $\alpha_{core}$ has a value of about 7.5. Further, the glass core 102 has the first radius $r_1$ of about 4.3 microns. Furthermore, the buffer clad region 104 has the second radius $r_2$ of about 9.82 microns. Moreover, the buffer relative refractive index $\Delta_2$ has a value of about −0.01. Also, the trench relative refractive index $\Delta_3$ has a value of about −0.34. Also, the trench region 106 has the third radius $r_3$ of about 15 microns. Also, the trench curve parameter $\alpha_{trench}$ has a value of about 8. Also, the cladding 108 has the fourth radius $r_4$ of about 62.5 microns. Also, the cladding relative refractive index $\Delta_4$ has a value of about 0. Also, the zero dispersion wavelength is about 1321 nanometer. Also, the mode field diameter is about 9.2 microns at wavelength of 1310 nanometer. Also, the cable cut off wavelength is about 1220 nanometer. Also, macro-bend loss of the optical fibre 100 is about 0.13 decibel per turn corresponding to wavelength of 1625 nanometer at bending radius of 7.5 millimeter. Also, macro-bend loss of the optical fibre 100 is about 0.058 decibel per turn corresponding to wavelength of 1550 nanometer at bending radius of 7.5 millimeter.

In another example, the core relative refractive index $\Delta_1$ has a value of about 0.35. In addition, the core curve parameter $\alpha_{core}$ has a value of about 9. Further, the glass core 102 has the first radius $r_1$ of about 4 microns. Furthermore, the buffer clad region 104 has the second radius $r_2$ of about 9.61 microns. Moreover, the buffer relative refractive index $\Delta_2$ has a value of about 0. Also, the trench relative refractive index $\Delta_3$ has a value of about −0.33. Also, the trench region 106 has the third radius $r_3$ of about 16 microns. Also, the trench curve parameter $\alpha_{trench}$ has a value of about 6. The cladding 108 has the fourth radius $r_4$ of about 62.5 microns. The cladding relative refractive index $\Delta_4$ has a value of about 0. The zero dispersion wavelength is about 1323 nanometer. The mode field diameter is about 9.03 microns at wavelength of 1310 nanometer. Also, the cable cut off wavelength is about 1205 nanometer. Also, macro-bend loss of the optical fibre 100 is about 0.19 decibel per turn corresponding to wavelength of 1625 nanometer at bending radius of 7.5 millimeter. Also, macro-bend loss of the optical fibre 100 is about 0.07 decibel per turn corresponding to wavelength of 1550 nanometer at bending radius of 7.5 millimeter.

In yet another example, the core relative refractive index $\Delta_1$ has a value of about 0.35. In addition, the core curve parameter $\alpha_{core}$ has a value of about 8.5. Further, the glass core 102 has the first radius $r_1$ of about 4.2 microns. Furthermore, the buffer clad region 104 has the second radius $r_2$ of about 9.62 microns. Moreover, the buffer relative refractive index $\Delta_2$ has a value of about 0. The trench relative refractive index $\Delta_3$ has a value of about −0.33. The trench region 106 has the third radius $r_3$ of about 16 microns. The trench curve parameter $\alpha_{trench}$ has a value of about 7. The cladding 108 has the fourth radius $r_4$ of about 62.5 microns. The cladding relative refractive index $\Delta_4$ has a value of about 0. The zero dispersion wavelength is about 1319 nanometer. The mode field diameter is about 9.17 microns at wavelength of 1310 nanometer. The cable cut off wavelength is about 1215 nanometer. The macro-bend loss of the optical fibre 100 is about 0.21 decibel per turn corresponding to wavelength of 1625 nanometer at bending radius of 7.5 millimeter. Also, macro-bend loss of the optical fibre 100 is about 0.1 decibel per turn corresponding to wavelength of 1550 nanometer at bending radius of 7.5 millimeter.

In yet another example, the core relative refractive index $\Delta_1$ has a value of about 0.35. In addition, the core curve parameter $\alpha_{core}$ has a value of about 8. Further, the glass core 102 has the first radius $r_1$ of about 3.6 microns. Furthermore, the buffer clad region 104 has the second radius $r_2$ of about 9.8 microns. Moreover, the buffer relative refractive index $\Delta_2$ has a value of about 0. The trench relative refractive index $\Delta_3$ has a value of about −0.33. The trench region 106 has the third radius $r_3$ of about 17 microns. The trench curve parameter $\alpha_{trench}$ has a value of about 6. The cladding 108 has the fourth radius $r_4$ of about 62.5 microns. The cladding relative refractive index $\Delta_4$ has a value of about 0. Also, the zero dispersion wavelength is about 1324 nanometer. Also, the mode field diameter is about 8.81 microns at wavelength of 1310 nanometer. The cable cut off wavelength is about 1187 nanometer. Also, macro-bend loss of the optical fibre 100 is about 0.18 decibel per turn corresponding to wavelength of 1625 nanometer at bending radius of 7.5 millimeter. The macro-bend loss of the optical fibre 100 is about 0.08 decibel per turn corresponding to wavelength of 1550 nanometer at bending radius of 7.5 millimeter.

In yet another example, the core relative refractive index $\Delta_1$ has a value of about 0.35. In addition, the core curve parameter $\alpha_{core}$ has a value of about 10. Further, the glass core 102 has the first radius $r_1$ of about 4 microns. Furthermore, the buffer clad region 104 has the second radius $r_2$ of about 9.8 microns. Moreover, the buffer relative refractive index $\Delta_2$ has a value of about 0. The trench relative refractive index $\Delta_3$ has a value of about −0.28. The trench region 106 has the third radius $r_3$ of about 16 microns. The trench curve parameter $\alpha_{trench}$ has a value of about 5. The cladding 108 has the fourth radius $r_4$ of about 62.5 microns. The cladding relative refractive index $\Delta_4$ has a value of about 0. The zero dispersion wavelength is about 1321 nanometer. The mode field diameter is about 9.07 microns at wavelength of 1310 nanometer. Also, the cable cut off wavelength is about 1198 nanometer. The macro-bend loss of the optical fibre 100 is about 0.20 decibel per turn corresponding to wavelength of 1625 nanometer at bending radius of 7.5 millimeter. Also, the macro-bend loss of the optical fibre 100 is about 0.10 decibel per turn corresponding to wavelength of 1550 nanometer at bending radius of 7.5 millimeter.

In yet another example, the core relative refractive index $\Delta_1$ has a value of about 0.35. In addition, the core curve parameter $\alpha_{core}$ has a value of about 8.5. Further, the glass core 102 has the first radius $r_1$ of about 4.2 microns. Furthermore, the buffer clad region 104 has the second radius $r_2$ of about 9.62 microns. Moreover, the buffer relative refractive index $\Delta_2$ has a value of about 0. The trench relative refractive index $\Delta_3$ has a value of about −0.29. The trench region 106 has the third radius $r_3$ of about 16 microns. The trench curve parameter $\alpha_{trench}$ has a value of about 7. The cladding 108 has the fourth radius $r_4$ of about 62.5 microns. The cladding relative refractive index $\Delta_4$ has a value of about 0. The zero dispersion wavelength is about 1319 nanometer. The mode field diameter is about 9.17 microns at wavelength of 1310 nanometer. The cable cut off wavelength is about 1208 nanometer. The macro-bend loss of the optical fibre 100 is about 0.29 decibel per turn corresponding to wavelength of 1625 nanometer at bending radius of 7.5 millimeter. The macro-bend loss of the optical fibre 100 is about 0.11 decibel per turn corresponding to wavelength of 1550 nanometer at bending radius of 7.5 millimeter.

In yet another example, the core relative refractive index $\Delta_1$ has a value of about 0.35. In addition, the core curve parameter $\alpha_{core}$ has a value of about 8. Further, the glass core 102 has the first radius $r_1$ of about 3.6 microns. Furthermore, the buffer clad region 104 has the second radius $r_2$ of about 9.8 microns. Moreover, the buffer relative refractive index $\Delta_2$ has a value of about 0.01. Also, the trench relative refractive index $\Delta_3$ has a value of about −0.27. Also, the trench region 106 has the third radius $r_3$ of about 19 microns. Also, the trench curve parameter $\alpha_{trench}$ has a value of about 5. Also, the cladding 108 has the fourth radius $r_4$ of about 62.5 microns. Also, the cladding relative refractive index $\Delta_4$ has a value of about 0. Also, the zero dispersion wavelength is about 1324 nanometer. Also, the mode field diameter is about 8.8 microns at wavelength of 1310 nanometer. Also, the cable cut off wavelength is about 1178 nanometer. Also, macro-bend loss of the optical fibre 100 is about 0.31 decibel per turn corresponding to wavelength of 1625 nanometer at bending radius of 7.5 millimeter. Also, macro-bend loss of the optical fibre 100 is about 0.18 decibel per turn corresponding to wavelength of 1550 nanometer at bending radius of 7.5 millimeter.

In yet another example, the core relative refractive index $\Delta_1$ has a value of about 0.35. In addition, the core curve parameter $\alpha_{core}$ has a value of about 10. Further, the glass core 102 has the first radius $r_1$ of about 4 microns. Furthermore, the buffer clad region 104 has the second radius $r_2$ of about 9.8 microns. Moreover, the buffer relative refractive index $\Delta_2$ has a value of about 0. Also, the trench relative refractive index $\Delta_3$ has a value of about −0.28. Also, the trench region 106 has the third radius $r_3$ of about 20 microns. Also, the trench curve parameter $\alpha_{trench}$ has a value of about 5. Also, the cladding 108 has the fourth radius $r_4$ of about 62.5 microns. Also, the cladding relative refractive index $\Delta_4$ has a value of about 0. Also, the zero dispersion wavelength is about 1321 nanometer. Also, the mode field diameter is about 9.08 microns at wavelength of 1310 nanometer. Also, the cable cut off wavelength is about 1208 nanometer. Also, macro-bend loss of the optical fibre 100 is about 0.21 decibel per turn corresponding to wavelength of 1625 nanometer at bending radius of 7.5 millimeter. Also, macro-bend loss of the optical fibre 100 is about 0.14 decibel per turn corresponding to wavelength of 1550 nanometer at bending radius of 7.5 millimeter.

In yet another example, the core relative refractive index $\Delta_1$ has a value of about 0.35. In addition, the core curve parameter $\alpha_{core}$ has a value of about 9.5. Further, the glass core 102 has the first radius $r_1$ of about 4 microns. Furthermore, the buffer clad region 104 has the second radius $r_2$ of about 9.61 microns. Moreover, the buffer relative refractive index $\Delta_2$ has a value of about 0. Also, the trench relative refractive index $\Delta_3$ has a value of about −0.27. Also, the trench region 106 has the third radius $r_3$ of about 16 microns. Also, the trench curve parameter $\alpha_{trench}$ has a value of about 8. Also, the cladding 108 has the fourth radius $r_4$ of about 62.5 microns. Also, the cladding relative refractive index $\Delta_4$ has a value of about 0. Also, the zero dispersion wavelength is about 1323 nanometer. Also, the mode field diameter is about 9.03 microns at wavelength of 1310 nanometer. Also, the cable cut off wavelength is about 1205 microns. Also, macro-bend loss of the optical fibre 100 is about 0.19 decibel per turn corresponding to wavelength of 1625 nanometer at bending radius of 7.5 millimeter. Also, macro-bend loss of the optical fibre 100 is about 0.10 decibel per turn corresponding to wavelength of 1550 nanometer at bending radius of 7.5 millimeter.

In yet another example, the core relative refractive index $\Delta_1$ has a value of about 0.36. In addition, the core curve parameter $\alpha_{core}$ has a value of about 6.5. Further, the glass core 102 has the first radius $r_1$ of about 4 microns. Furthermore, the buffer clad region 104 has the second radius $r_2$ of about 9.81 microns. Moreover, the buffer relative refractive index $\Delta_2$ has a value of about 0. Also, the trench relative refractive index $\Delta_3$ has a value of about −0.33. Also, the trench region 106 has the third radius $r_3$ of about 16 microns. Also, the trench curve parameter $\alpha_{trench}$ has a value of about 7. Also, the cladding 108 has the fourth radius $r_4$ of about 62.5 microns. Also, the cladding relative refractive index $\Delta_4$ has a value of about 0. Also, the zero dispersion wavelength is about 1316 nanometer. Also, the mode field diameter is about 9.12 microns at wavelength of 1310 nanometer. Also, the cable cut off wavelength is about 1213 nanometer. Also, macro-bend loss of the optical fibre 100 is about 0.14 decibel per turn corresponding to wavelength of 1625 nanometer at bending radius of 7.5 millimeter. Also, macro-bend loss of the optical fibre 100 is about 0.07 decibel per turn corresponding to wavelength of 1550 nanometer at bending radius of 7.5 millimeter.

In yet another example, the core relative refractive index $\Delta_1$ has a value of about 0.36. In addition, the core curve parameter $\alpha_{core}$ has a value of about 6.5. Further, the glass core 102 has the first radius $r_1$ of about 4 microns. Furthermore, the buffer clad region 104 has the second radius $r_2$ of about 9.81 microns. Moreover, the buffer relative refractive index $\Delta_2$ has a value of about −0.01. Also, the trench relative refractive index $\Delta_3$ has a value of about −0.35. Also, the trench region 106 has the third radius $r_3$ of about 16 microns. Also, the trench curve parameter $\alpha_{trench}$ has a value of about 5. Also, the cladding 108 has the fourth radius $r_4$ of about 62.5 microns. Also, the cladding relative refractive index $\Delta_4$ has a value of about 0. Also, the zero dispersion wavelength is about 1322 nanometer. Also, the mode field diameter is about 8.96 microns at wavelength of 1310 nanometer. Also, the cable cut off wavelength is about 1200 nanometer. Also, macro-bend loss of the optical fibre 100 is about 0.15 decibel per turn corresponding to wavelength of 1625 nanometer at bending radius of 7.5 millimeter. Also, macro-bend loss of the optical fibre 100 is about 0.08 decibel per turn corresponding to wavelength of 1550 nanometer at bending radius of 7.5 millimeter.

In yet another example, the core relative refractive index $\Delta_1$ has a value of about 0.36. In addition, the core curve parameter $\alpha_{core}$ has a value of about 6.5. Further, the glass core 102 has the first radius $r_1$ of about 4.1 microns. Furthermore, the buffer clad region 104 has the second radius $r_2$ of about 9.81 microns. Moreover, the buffer relative refractive index $\Delta_2$ has a value of about 0. Also, the trench relative refractive index $\Delta_3$ has a value of about −0.29. Also, the trench region 106 has the third radius $r_3$ of about 16 microns. Also, the trench curve parameter $\alpha_{trench}$ has a value of about 6. Also, the cladding 108 has the fourth radius $r_4$ of about 62.5 microns. Also, the cladding relative refractive index $\Delta_4$ has a value of about 0. Also, the zero dispersion wavelength is about 1327 nanometer. Also, the mode field diameter is about 8.97 microns at wavelength of 1310 nanometer. Also, the cable cut off wavelength is about 1190 nanometer. Also, macro-bend loss of the optical fibre 100 is about 0.23 decibel per turn corresponding to wavelength of 1625 nanometer at bending radius of 7.5 millimeter. Also, macro-bend loss of the optical fibre 100 is about 0.12 decibel per turn corresponding to wavelength of 1550 nanometer at bending radius of 7.5 millimeter.

In yet another example, the core relative refractive index $\Delta_1$ has a value of about 0.37. In addition, the core curve parameter $\alpha_{core}$ has a value of about 7. Further, the glass core 102 has the first radius $r_1$ of about 4.2 microns. Furthermore, the buffer clad region 104 has the second radius $r_2$ of about 9.8 microns. Moreover, the buffer relative refractive index $\Delta_2$ has a value of about 0. Also, the trench relative refractive index $\Delta_3$ has a value of about −0.33. Also, the trench region 106 has the third radius $r_3$ of about 16 microns. Also, the trench curve parameter $\alpha_{trench}$ has a value of about 6. Also, the cladding 108 has the fourth radius $r_4$ of about 62.5 microns. Also, the cladding relative refractive index $\Delta_4$ has a value of about 0. Also, the zero dispersion wavelength is about 1318 nanometer. Also, the mode field diameter is about 8.93 microns at wavelength of 1310 nanometer. Also, the cable cut off wavelength is about 1240 nanometer. Also, macro-bend loss of the optical fibre 100 is about 0.10 decibel per turn corresponding to wavelength of 1625 nanometer at bending radius of 7.5 millimeter. Also, macro-bend loss of the optical fibre 100 is about 0.04 decibel per turn corresponding to wavelength of 1550 nanometer at bending radius of 7.5 millimeter.

In yet another example, the core relative refractive index $\Delta_1$ has a value of about 0.37. In addition, the core curve parameter $\alpha_{core}$ has a value of about 7. Further, the glass core 102 has the first radius $r_1$ of about 4.2 microns. Furthermore, the buffer clad region 104 has the second radius $r_2$ of about 9.81 microns. Moreover, the buffer relative refractive index $\Delta_2$ has a value of about 0. Also, the trench relative refractive index $\Delta_3$ has a value of about −0.33. Also, the trench region 106 has the third radius $r_3$ of about 16 microns. Also, the trench curve parameter $\alpha_{trench}$ has a value of about 7. Also, the cladding 108 has the fourth radius $r_4$ of about 62.5 microns. Also, the cladding relative refractive index $\Delta_4$ has a value of about 0. Also, the zero dispersion wavelength is about 1318 nanometer. Also, the mode field diameter is about 8.98 microns at wavelength of 1310 nanometer. Also, the cable cut off wavelength is about 1250 nanometer. Also, macro-bend loss of the optical fibre 100 is about 0.08 decibel per turn corresponding to wavelength of 1625 nanometer at bending radius of 7.5 millimeter. Also, macro-bend loss of the optical fibre 100 is about 0.04 decibel per turn corresponding to wavelength of 1550 nanometer at bending radius of 7.5 millimeter.

In yet another example, the core relative refractive index $\Delta_1$ has a value of about 0.37. In addition, the core curve parameter $\alpha_{core}$ has a value of about 7.5. Further, the glass core 102 has the first radius $r_1$ of about 4.3 microns. Furthermore, the buffer clad region 104 has the second radius $r_2$ of about 9.82 microns. Moreover, the buffer relative refractive index $\Delta_2$ has a value of about 0. Also, the trench relative refractive index $\Delta_3$ has a value of about −0.33. Also, the trench region 106 has the third radius $r_3$ of about 14 microns. Also, the trench curve parameter $\alpha_{trench}$ has a value of about 5. Also, the cladding 108 has the fourth radius $r_4$ of about 62.5 microns. Also, the cladding relative refractive index $\Delta_4$ has a value of about 0. Also, the zero dispersion wavelength is about 1318 nanometer. Also, the mode field diameter is about 9.1 microns at wavelength of 1310 nanometer. Also, the cable cut off wavelength is about 1235 nanometer. Also, macro-bend loss of the optical fibre 100 is about 0.10 decibel per turn corresponding to wavelength of 1625 nanometer at bending radius of 7.5 millimeter. Also, macro-bend loss of the optical fibre 100 is about 0.04 decibel per turn corresponding to wavelength of 1550 nanometer at bending radius of 7.5 millimeter.

In yet another example, the core relative refractive index $\Delta_1$ has a value of about 0.37. In addition, the core curve parameter $\alpha_{core}$ has a value of about 7. Further, the glass core 102 has the first radius $r_1$ of about 4 microns. Furthermore, the buffer clad region 104 has the second radius $r_2$ of about 9.61 microns. Moreover, the buffer relative refractive index $\Delta_2$ has a value of about 0. Also, the trench relative refractive index $\Delta_3$ has a value of about −0.33. Also, the trench region 106 has the third radius $r_3$ of about 17 microns. Also, the trench curve parameter $\alpha_{trench}$ has a value of about 7. Also, the cladding 108 has the fourth radius $r_4$ of about 62.5 microns. Also, the cladding relative refractive index $\Delta_4$ has a value of about 0. Also, the zero dispersion wavelength is about 1322 nanometer. Also, the mode field diameter is about 8.9 microns at wavelength of 1310 nanometer. Also, the cable cut off wavelength is about 1215 nanometer. Also, macro-bend loss of the optical fibre 100 is about 0.13 decibel per turn corresponding to wavelength of 1625 nanometer at bending radius of 7.5 millimeter. Also, macro-bend loss of the optical fibre 100 is about 0.06 decibel per turn corresponding to wavelength of 1550 nanometer at bending radius of 7.5 millimeter.

In yet another example, the core relative refractive index $\Delta_1$ has a value of about 0.37. In addition, the core curve parameter $\alpha_{core}$ has a value of about 6.5. Further, the glass core 102 has the first radius $r_1$ of about 3.8 microns. Furthermore, the buffer clad region 104 has the second radius $r_2$ of about 9.6 microns. Moreover, the buffer relative refractive index $\Delta_2$ has a value of about 0. Also, the trench relative refractive index $\Delta_3$ has a value of about −0.31. Also, the trench region 106 has the third radius $r_3$ of about 15 microns. Also, the trench curve parameter $\alpha_{trench}$ has a value of about 8. Also, the cladding 108 has the fourth radius $r_4$ of about 62.5 microns. Also, the cladding relative refractive index $\Delta_4$ has a value of about 0. Also, the zero dispersion wavelength is about 1321 nanometer. Also, the mode field diameter is about 9.03 microns at wavelength of 1310 nanometer. Also, the cable cut off wavelength is about 1220 nanometer. Also, macro-bend loss of the optical fibre 100 is about 0.13 decibel per turn corresponding to wavelength of 1625 nanometer at bending radius of 7.5 millimeter. Also, macro-bend loss of the optical fibre 100 is about 0.06 decibel per turn corresponding to wavelength of 1550 nanometer at bending radius of 7.5 millimeter.

In yet another example, the core relative refractive index $\Delta_1$ has a value of about 0.37. In addition, the core curve parameter $\alpha_{core}$ has a value of about 6.5. Further, the glass core 102 has the first radius $r_1$ of about 3.8 microns. Furthermore, the buffer clad region 104 has the second radius $r_2$ of about 9.6 microns. Moreover, the buffer relative refractive index $\Delta_2$ has a value of about 0.01. Also, the trench relative refractive index $\Delta_3$ has a value of about −0.27. Also, the trench region 106 has the third radius $r_3$ of about 15 microns. Also, the trench curve parameter $\alpha_{trench}$ has a value of about 8. Also, the cladding 108 has the fourth radius $r_4$ of about 62.5 microns. Also, the cladding relative refractive index $\Delta_4$ has a value of about 0. Also, the zero dispersion wavelength is about 1322 nanometer. Also, the mode field diameter is about 9.04 microns at wavelength of 1310 nanometer. Also, the cable cut off wavelength is about 1205 nanometer. Also, macro-bend loss of the optical fibre 100 is about 0.19 decibel per turn corresponding to wavelength of 1625 nanometer at bending radius of 7.5 millimeter. Also, macro-bend loss of the optical fibre 100 is about 0.09 decibel per turn corresponding to wavelength of 1550 nanometer at bending radius of 7.5 millimeter.

In yet another example, the core relative refractive index $\Delta_1$ has a value of about 0.37. In addition, the core curve parameter $\alpha_{core}$ has a value of about 7. Further, the glass core 102 has the first radius $r_1$ of about 4.2 microns. Furthermore, the buffer clad region 104 has the second radius $r_2$ of about 9.81 microns. Moreover, the buffer relative refractive index $\Delta_2$ has a value of about 0. Also, the trench relative refractive index $\Delta_3$ has a value of about −0.29. Also, the trench region 106 has the third radius $r_3$ of about 16 microns. Also, the trench curve parameter $\alpha_{trench}$ has a value of about 7. Also, the cladding 108 has the fourth radius $r_4$ of about 62.5 microns. Also, the cladding relative refractive index $\Delta_4$ has a value of about 0. Also, the zero dispersion wavelength is about 1318 nanometer. Also, the mode field diameter is about 8.99 microns at wavelength of 1310 nanometer. Also, the cable cut off wavelength is about 1250 nanometer. Also, macro-bend loss of the optical fibre 100 is about 0.11 decibel per turn corresponding to wavelength of 1625 nanometer at bending radius of 7.5 millimeter. Also, macro-bend loss of the optical fibre 100 is about 0.04 decibel per turn corresponding to wavelength of 1550 nanometer at bending radius of 7.5 millimeter.

In yet another example, the core relative refractive index $\Delta_1$ has a value of about 0.37. In addition, the core curve parameter $\alpha_{core}$ has a value of about 7.5. Further, the glass core 102 has the first radius $r_1$ of about 4.2 microns. Furthermore, the buffer clad region 104 has the second radius $r_2$ of about 9.82 microns. Moreover, the buffer relative refractive index $\Delta_2$ has a value of about 0.01. Also, the trench relative refractive index $\Delta_3$ has a value of about −0.27. Also, the trench region 106 has the third radius $r_3$ of about 16 microns. Also, the trench curve parameter $\alpha_{trench}$ has a value of about 7. Also, the cladding 108 has the fourth radius $r_4$ of about 62.5 microns. Also, the cladding relative refractive index $\Delta_4$ has a value of about 0. Also, the zero dispersion wavelength is about 1318 nanometer. Also, the mode field diameter is about 8.95 microns at wavelength of 1310 nanometer. Also, the cable cut off wavelength is about 1235 nanometer. Also, macro-bend loss of the optical fibre 100 is about 0.13 decibel per turn corresponding to wavelength of 1625 nanometer at bending radius of 7.5 millimeter. Also, macro-bend loss of the optical fibre 100 is about 0.06 decibel per turn corresponding to wavelength of 1550 nanometer at bending radius of 7.5 millimeter.

In yet another example, the core relative refractive index $\Delta_1$ has a value of about 0.37. In addition, the core curve parameter $\alpha_{core}$ has a value of about 7. Further, the glass core 102 has the first radius $r_1$ of about 3.8 microns. Furthermore, the buffer clad region 104 has the second radius $r_2$ of about 9.61 microns. Moreover, the buffer relative refractive index $\Delta_2$ has a value of about 0. Also, the trench relative refractive index $\Delta_3$ has a value of about −0.30. Also, the trench region 106 has the third radius $r_3$ of about 16 microns. Also, the trench curve parameter $\alpha_{trench}$ has a value of about 5. Also, the cladding 108 has the fourth radius $r_4$ of about 62.5 microns. Also, the cladding relative refractive index $\Delta_4$ has a value of about 0. Also, the zero dispersion wavelength is about 1324 nanometer. Also, the mode field diameter is about 8.9 microns at wavelength of 1310 nanometer. Also, the cable cut off wavelength is about 1201 nanometer. Also, macro-bend loss of the optical fibre 100 is about 0.19 decibel per turn corresponding to wavelength of 1625 nanometer at bending radius of 7.5 millimeter. Also, macro-bend loss of the optical fibre 100 is about 0.09 decibel per turn corresponding to wavelength of 1550 nanometer at bending radius of 7.5 millimeter.

Further, the optical fibre 100 has a core clad concentricity error of up to 0.5. Further, the optical fibre 100 has cladding non-circularity percentage of up to 0.7 percent. Further, the optical fibre 100 has a zero dispersion slope of up to 0.092 picosecond/(nanometer$^2$·kilometer). The optical fibre 100 may have a prof testing is at least 100 or more kpsi. Further, the optical fibre 100 has a coating strip force is in between 1.3-5.0 Newton. Further, the optical fibre 100 has a fibre curl in is at least 4 meters or more. Further, the optical fibre 100 has coatings cladding concentricity error of up to 12 micro meters.

The optical fibre 100 may be designed and manufactured form Rod in Cylinder method. Further, the optical fibre may be designed and manufactured from outside vapor deposition method.

The optical fibre 100 is compliant with G657.A2 bend-insensitive fibre that splices seamlessly with standard single mode fibres. Further, the optical fibre 100 that is compliant with G657.A2 bend insensitive fibre, has an optimized design with the same mode field diameter as standard G.652.D fibres to ensure full compatibility with a G.652.D installed optical fibre base. The optical fibre 100 may splice with standard single mode fibre such that the optical fibre 100 has full compatibility with a G652.D category installed optical fibres and G657.A1 category optical fibre.

The optical fibre 100 enables next-level cable designs and bend performance, while streamlining field optical time domain reflectometer (OTDR) testing protocols. The optical fibre 100 has extreme bend performance of G.657A2 category optical fibre with the splicing convenience of a G.657.A1 design. The optical fibre 100 has a bend-insensitive property that assists in conserving optical power in closures and other locations where bending losses can quickly add up, further improving optical power margins.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:
1. An optical fibre (100) comprising:
a glass core (102);
a trench region (106), wherein the trench region (106) has a trench curve parameter $\alpha_{trench}$ in a range of 5 to 8, wherein the trench region (106) has a trench relative refractive index in a range of −0.25 to −0.35 and a trench thickness in a range of 6 to 10 microns; and
a cladding (108), wherein the optical fibre (100) has a mode field diameter in a range of 8.7 micrometers to 9.7 micrometers at wavelength of 1310 nanometer, wherein the optical fibre (100) has at least one of macro-bend loss up to 0.5 decibel per turn corresponding to wavelength of 1550 nanometer at bending radius of 7.5 millimeter, macro-bend loss up to 1.0 decibel per turn corresponding to wavelength of 1625 nanometer at bending radius of 7.5 millimeter, macro-bend loss up to 0.1 decibel per turn corresponding to wavelength of 1550 nanometer at bending radius of 10 millimeter, macro-bend loss up to 0.2 decibel per turn corresponding to wavelength of 1625 nanometer at bending radius of 10 millimeter and macro-bend loss up to 0.03 decibel per 10 turn corresponding to wavelength of 1550 nanometer at bending radius of 15 millimeter, and macro-bend loss is up to 0.1 decibel per 10 turn corresponding to wavelength of 1625 nanometer at bending radius of 15 millimeter.

2. The optical fibre (100) as claimed in claim 1 further comprising a buffer clad region (104) after the glass core (102) and before the trench region (106).

3. The optical fibre (100) as claimed in claim 1, wherein the glass core (102) has a core curve parameter are in a range of 6 to 12.

4. The optical fibre (100) as claimed in claim 1, wherein the optical fibre (100) has an attenuation of up to 0.18 dB/km at a wavelength of 1550 nanometer.

5. The optical fibre (100) as claimed in claim 1, wherein the optical fibre (100) splices with standard single mode fibre such that the optical fibre (100) is compatible with a G652.D category installed optical fibre and G657.A1 category optical fibre.

6. The optical fibre (100) as claimed in claim 1 further comprising a buffer clad region (104), wherein the buffer clad region (104) has a buffer relative refractive index in a range of −0.01 to 0.01 and a buffer thickness of up to 5.5 microns.

7. The optical fibre (100) as claimed in claim 1, wherein the glass core (102) has a core relative refractive index in a range of 0.30 to 0.40 and the glass core (102) has a thickness is in a range of 3.5 to 4.5.

8. The optical fibre (100) as claimed in claim 1, wherein the cladding (108) has a cladding relative refractive index in a range of 0 to 0.05 and a cladding thickness in a range of 42.9 to 47.1 microns.

9. The optical fibre (100) as claimed in claim 1, wherein the optical fibre (100) has at least one of a cable cut off wavelength of up to 1260 nanometer, a zero dispersion wavelength in a range of 1300 nanometer to 1324 nanometer and a dispersion of up to 18 picosecond/(nanometer-kilometer).

* * * * *